United States Patent
Namihira

(10) Patent No.: US 9,515,846 B2
(45) Date of Patent: Dec. 6, 2016

(54) SWITCH AND SETTING METHOD

(71) Applicant: FUJITSU LIMITED, Kawasaki-shi, Kanagawa (JP)

(72) Inventor: Daisuke Namihira, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/746,927

(22) Filed: Jun. 23, 2015

(65) Prior Publication Data

US 2015/0295730 A1 Oct. 15, 2015

Related U.S. Application Data

(63) Continuation of application No. PCT/JP2013/054162, filed on Feb. 20, 2013.

(51) Int. Cl.

| | |
|---|---|
| *H04L 12/931* | (2013.01) |
| *H04L 12/937* | (2013.01) |
| *H04L 12/935* | (2013.01) |
| *H04L 12/28* | (2006.01) |
| *H04L 12/46* | (2006.01) |
| *H04L 12/24* | (2006.01) |

(52) U.S. Cl.
CPC ........... *H04L 12/4641* (2013.01); *H04L 41/08* (2013.01)

(58) Field of Classification Search
CPC ...... H04L 41/0803; H04L 49/15; H04L 45/00; H04L 49/70; H04L 41/08; H04L 41/0813; H04L 41/0816; H04L 41/0823; H04L 41/0836; H04L 49/253; H04L 12/46; H04L 12/4641; H04L 12/4675
See application file for complete search history.

(56) References Cited

U.S. PATENT DOCUMENTS

| | | | | |
|---|---|---|---|---|
| 7,693,158 | B1 * | 4/2010 | Carrie | H04L 12/4641 370/395.53 |
| 8,238,357 | B2 * | 8/2012 | Sonoda | H04L 12/4641 370/252 |
| 8,259,718 | B2 * | 9/2012 | Akahane | H04L 45/00 370/389 |
| 8,824,485 | B2 * | 9/2014 | Biswas | H04L 49/70 370/395.53 |

(Continued)

FOREIGN PATENT DOCUMENTS

| | | |
|---|---|---|
| DE | 102011080676 A1 | 2/2013 |
| EP | 1394998 A2 | 3/2004 |

(Continued)

OTHER PUBLICATIONS

Extended European Search Report mailed Jan. 29, 2016 for corresponding European Patent Application No. 13875498.1, 7 pages.

(Continued)

*Primary Examiner* — Ahmed Elallam
(74) *Attorney, Agent, or Firm* — Fujitsu Patent Center

(57) ABSTRACT

A disclosed switch includes: a first applying unit that applies a setting of a virtual subnetwork to a first port that is connected to an external apparatus, upon detecting an instruction to apply the setting to the first port; and a second applying unit that applies, upon detecting that the setting was applied to the first port in the switch or other switches, the setting to a second port that is connected to an external network and is associated with the first port in advance.

10 Claims, 10 Drawing Sheets

(56) References Cited

U.S. PATENT DOCUMENTS

| | | | |
|---|---|---|---|
| 9,100,294 B2* | 8/2015 | Balasubramanian | H04L 41/0803 |
| 2010/0040068 A1 | 2/2010 | Wimmer | |
| 2014/0269743 A1* | 9/2014 | Srinivasan | ............. H04L 49/20 370/401 |

FOREIGN PATENT DOCUMENTS

| | | |
|---|---|---|
| JP | 9-284328 | 10/1997 |
| JP | 9-284329 | 10/1997 |
| JP | 2002-135282 | 5/2002 |
| JP | 2005-286483 | 10/2005 |
| JP | 2006-80622 | 3/2006 |

OTHER PUBLICATIONS

International Search Report, mailed in connection with PCT/JP2013/054162 and mailed Mar. 26, 2013.

\* cited by examiner

| PORT NUMBER | PORT TYPE | GROUP NUMBER LIST |
|---|---|---|
| 1 | End Port | 1 |
| 2 | End Port | 2 |
| 3 | Network Port | 1,2 |
| 4 | —(Inner Port) | — |

| PORT NUMBER | VLAN ID | COOPERATION POSSIBILITY | SETTING COUNTER |
|---|---|---|---|
| 1 | 1 | ○ | 0 |
| | 2 | × | 0 |
| | ... | ... | ... |
| 2 | 1 | × | 0 |
| | ... | ... | ... |

SWITCH AND SETTING METHOD

CROSS-REFERENCE TO RELATED APPLICATIONS

This application is a continuation application, filed under 35 U.S.C. section 111(a), of International Application PCT/JP2013/054162, filed on Feb. 20, 2013, the entire contents of which are incorporated herein by reference.

FIELD

This technique relates to a technique for setting switches automatically.

BACKGROUND

Systems in data centers or companies have been integrated by cloud migration recently. As described in FIG. 1, a cloud system includes virtualized servers (or storages) and network switches connecting them (hereinafter, abbreviated to switches), and is often connected to a core network (a router, a L3 (Layer 3) switch, and the like. It is also called an external network that is different from a network including switches) through the switches.

As servers are virtualized and comprehensively managed in configuration of such a cloud system, efficiency of operation is sometimes improved by virtually unifying plural switches into one and unifying control and management of plural routes.

Here, a switch side provides networks used by each VM (Virtual Machine) as communication environment of layer 2, because VMs that operate on servers in virtual environment are ordinarily interconnected by layer 2. Moreover, it is general to provide layer 2 communication environment among VMs by using VLAN (Virtual Local Area Network) or the like, because the networks used by each VM (a broadcast range of layer 2) are different from each other.

In present server virtualizing systems, there are several methods that define a VLAN between a server and a port of a switch that is directly connected to the server, and a VLAN definition in a boundary point between the server and the port is automatically or manually set according to a state of a VM that is used.

On the other hand, when servers communicate with external networks through a core network, a setting of the same VLAN as a VLAN that has been defined for ports of switches that are directly connected to the servers is applied to ports of switches that are connected to the core network. However, there is no proper method for setting a VLAN like this automatically.

Patent Document 1: Japanese Laid-open Patent Publication No. 09-284328

Patent Document 2: Japanese Laid-open Patent Publication No. 09-284329

SUMMARY

A switch relating to this technique includes: a memory; and a processor configured to use the memory and execute a process. And the process includes: first applying a setting of a virtual subnetwork to a first port that is connected to an external apparatus, upon detecting an instruction to apply the setting to the first port; and upon detecting that the setting was applied to the first port in the switch or other switches, second applying the setting to a second port that is connected to an external network and is associated with the first port in advance.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram for explaining a relationship among a core network, switches, and external apparatuses such as servers or the like;

DESCRIPTION OF EMBODIMENTS

By using FIG. 2, an example of a network relating to this embodiment will be explained. In this embodiment, a network including switches 1 to 6 is set up between a core network and external apparatuses such as servers and storages. The switches 1 and 2 include a port connected to the core network (hereinafter referred to as a Network Port) and a port connected to other switches (hereinafter referred to an Inner Port). On the other hand, the switches 3 to 6 include a port connected to the external apparatuses such as servers (hereinafter referred to as an End Port) and the inner port connected to other switches.

Figure 1:
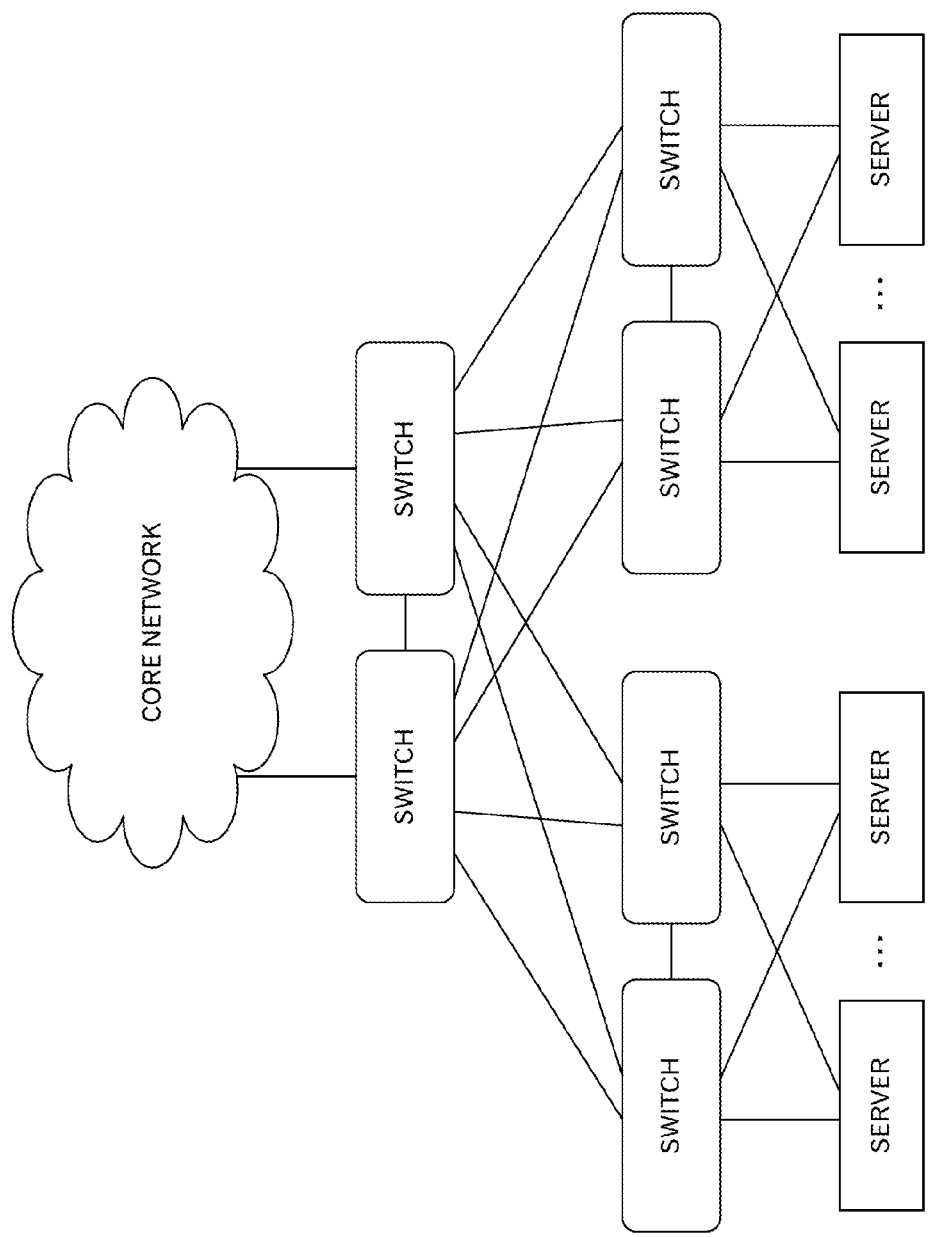
Figure 2:
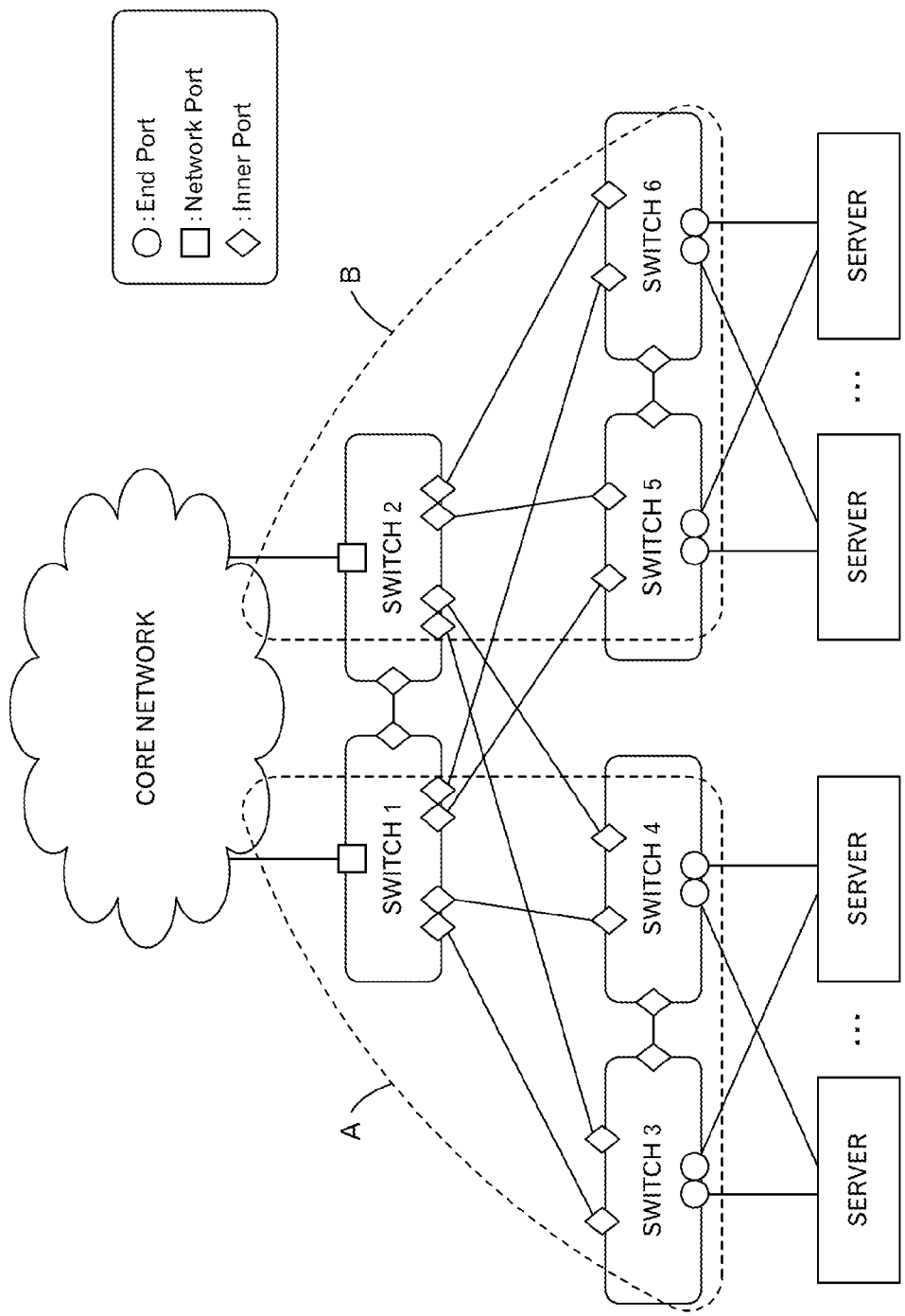
FIG. 2 is a diagram for explaining an outline of this embodiment.

In this embodiment, a VLAN definition that has been set for end ports of the switches 3 and 4 in FIG. 2 is reflected to a network port of the switch 1 connected to the core network. In other words, the VLAN definition is reflected by defining the end ports and the network port surrounded by a dotted line A as one group A. On the other hand, a VLAN definition that has been set for end ports of the switches 5 and 6 is reflected to a network port of the switch 2 connected to the core network. In other words, the VLAN definition is reflected by defining the end ports and the network port surrounded by a dotted line B as one group B. An end port and a network port sometimes belong to plural groups. By defining such groups, it becomes possible to control a range to which a VLAN definition is reflected.

In this embodiment, the VLAN definition that has been set in the end ports is also reflected to inner ports. This is because Ethernet (a registered trademark) frames of each VLAN are exchanged through the inner ports among switches 1 to 6.

Figures 3, 4:
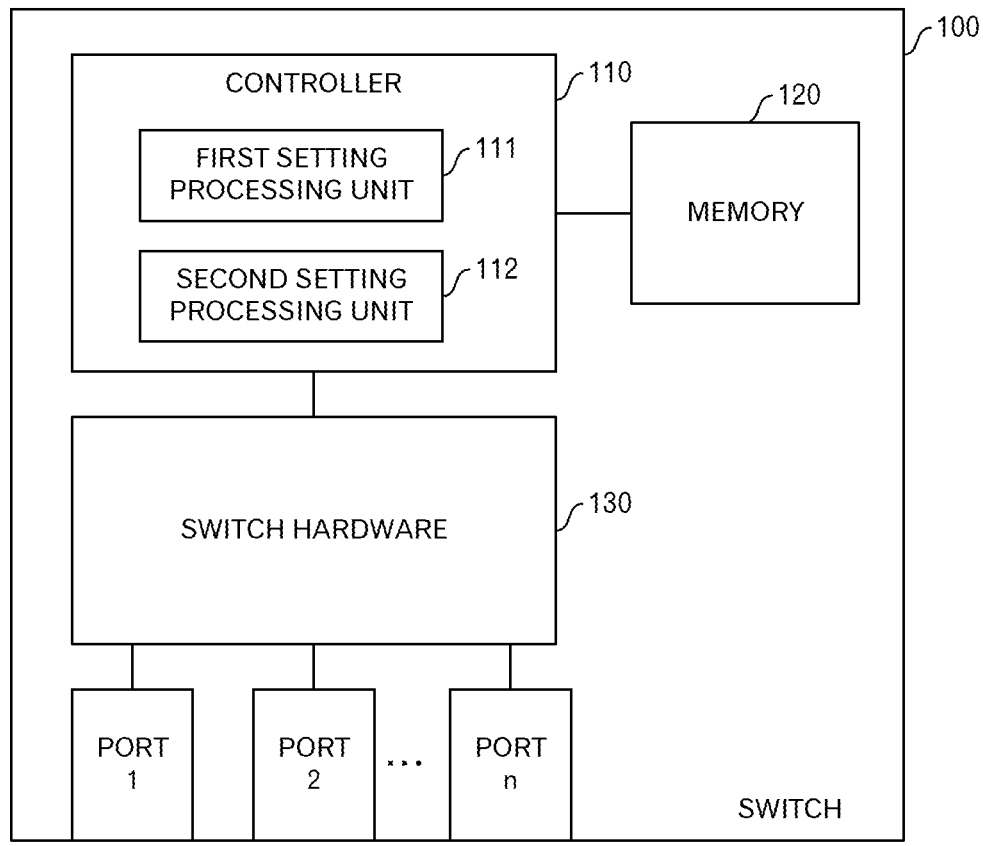
FIG. 3 is a diagram depicting an example of configuration of a switch relating to this embodiment.
FIG. 4 is a diagram depicting an example of a port information table.

Next, FIG. 3 illustrates a functional block diagram of a switch relating to this embodiment. A switch 100 includes a controller 110, a memory 120, a switch hardware 130, and ports 1 to n. The controller 110 controls the whole switch 100 including the switch hardware 130, and includes a first setting processing unit 111 that changes settings of VLAN definitions for end ports of the switch 100 and that notifies the switch 100 and other switches, and a second setting processing unit 112 that changes settings of VLAN definitions for ports other than the end ports according to the notification from the switch 100 or other switches. The controller 110 is realized by, for example, a combination of a processor and programs. In this case, the programs stored in the memory 120 or other ROM (Read Only Memories) are executed by the processor and the controller 110 is realized. The memory 120 stores data used in processing executed by the controller 110.

The switch hardware 130 is a semiconductor apparatus that relays frames among ports. The switch 100 is called a Fabric switch, and may be a switch that can use plural lines as redundant routes by logically unifying plural switches of the same kinds into one switch and exchanging conditions inside. In this case, the switch hardware 130 has a function that communicates with other Fabric switches by an original format of the switch hardware 130. The ports 1 to n are connected with cables that connect other Fabric switches, external networks, servers, and the like.

Moreover, a port information table and a VLAN cooperation table are stored in the memory 120. FIG. 4 illustrates an example of the port information table. In the example of FIG. 4, a port type (End Port/Network Port/Inner Port) and a group number list, which is a list of group numbers are registered in association with a port number. As described above, in FIG. 4, a port whose port number is 3 belongs to both the group 1 and the group 2. On the other hand, a port whose port number is 1 and a port whose port number is 2 belong to the group 1 and the group 2, respectively. A user is able to set the port type and the group number list. For example, the user sets them by using a conventional setting interface for switch such as CLI (Command Line Interface), Web, or the like.

Figures 5, 8:
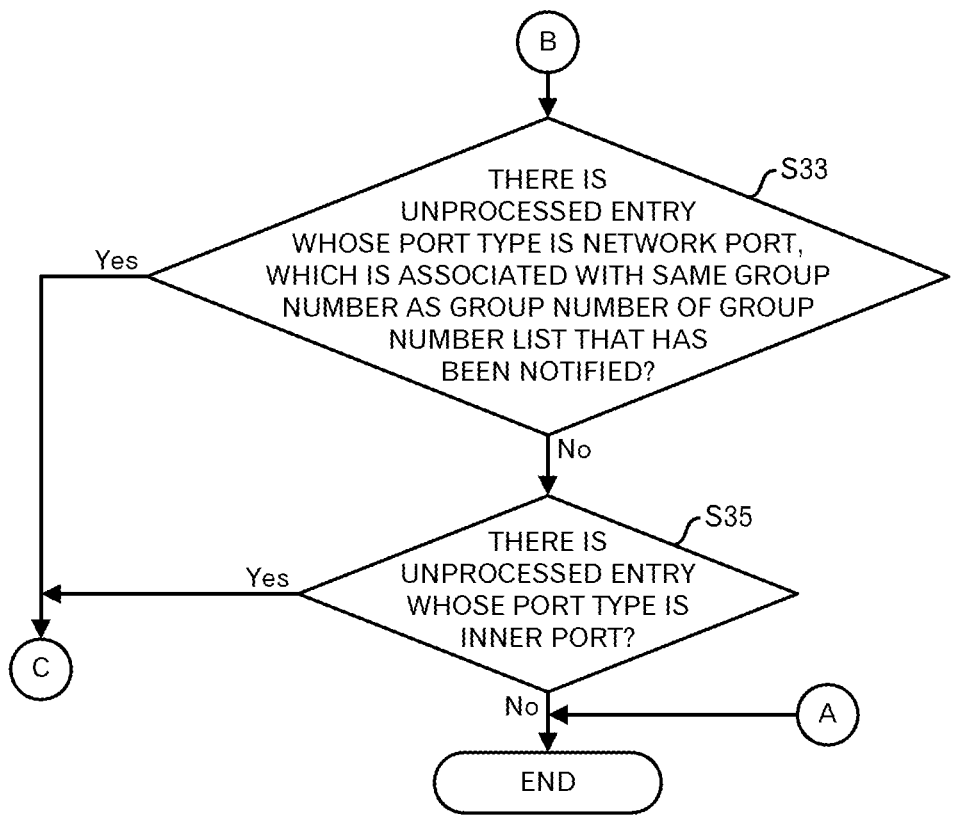
FIG. 5 is a diagram depicting an example of a VLAN cooperation table.
FIG. 8 is a diagram depicting a processing flow performed when receiving the VLAN definition cooperation notification.

Moreover, FIG. 5 illustrates an example of the VLAN cooperation table. In the example of FIG. 5, a VLAN ID, a cooperation possibility flag, and a setting counter are registered in association with a port number. As for a combination of the VLAN ID and the cooperation possibility flag, a user sets, for each port, for all possible combinations in advance. The cooperation possibility flag is a flag that represents whether cooperative processing for reflecting the VLAN definition to other switches when a VLAN is defined is performed or not. Moreover, an initial value of the setting counter is 0.

Moreover, each switch 100 maintains address information of other switches (or the address information is defined in advance) to communicate with other switches. Moreover, when so-called Fabric that operates as one logical switch as a whole is provided as the switches 1 to 6 in FIG. 2, notification as described below may be used by using inner communication for Fabric configuration.

Next, by using FIGS. 6 to 11, operation of the switch 100 will be explained. First, by using FIG. 6, processing of the first setting processing unit 111, which is performed when a VLAN is defined, will be explained.

Figure 6:
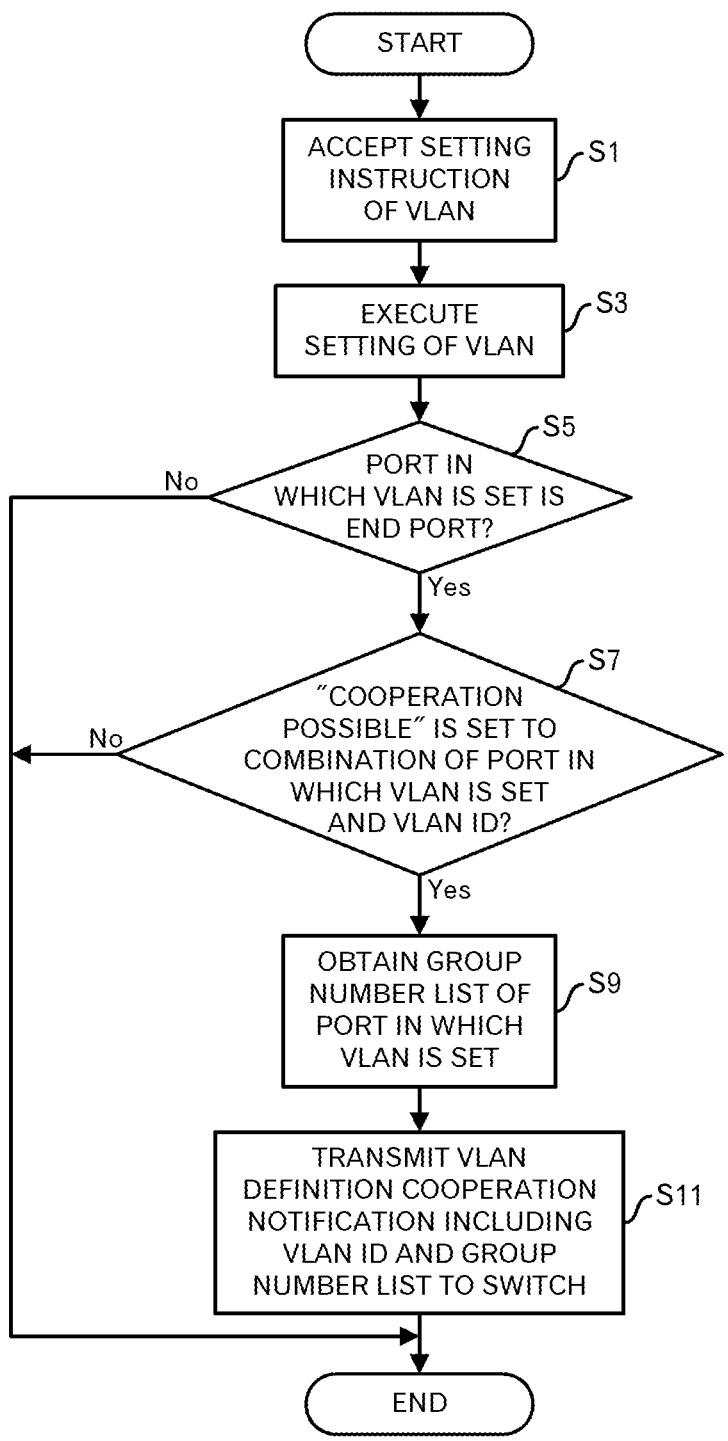
FIG. 6 is a diagram depicting a processing flow performed when defining a VLAN.

The first setting processing unit 111 accepts a setting instruction of VLAN for a specific port through a predetermined interface (FIG. 6: step S1). The setting instruction of VLAN includes a VLAN ID of a VLAN to be defined.

Then, the first setting processing unit 111 applies a setting of a VLAN to the specific port, for example, through the switch hardware 130 (step S3). For example, the VLAN ID is registered.

Moreover, the first setting processing unit 111 searches the port information table by the port number of the specific port for which the VLAN has been set, and determines whether the specific port is an end port or not (step S5). When it is determined that the specific port is not end port, the processing ends because the VLAN definition is not reflected to other ports and other switches.

On the other hand, when the specific port is an end port, the first setting processing unit 111 determines whether "cooperation possible" is set for a combination of the specific port for which the VLAN has been set and the set VLAN ID in the VLAN cooperation table (step S7). It is determined whether the cooperation possibility flag represents that it is possible to cooperate or not. When it is determined that it is impossible to cooperate, the processing ends.

On the other hand, when it is determined that "cooperation possible" is set for the combination, the first setting processing unit 111 reads out a group number list of the specific port for which VLAN has been set from the port information table (step S9). Furthermore, the first setting processing unit 111 generates VLAN definition cooperation notification including the VLAN ID and the group number list that has been read out, and transmits it to the second setting processing unit 112 of the switch 100 and other switches (step S11). Then, the processing ends.

Thus, the first setting processing unit 111 sets the VLAN definition that has been instructed for the specific port, and notifies the VLAN definition to be reflected to other switches.

Figure 7:
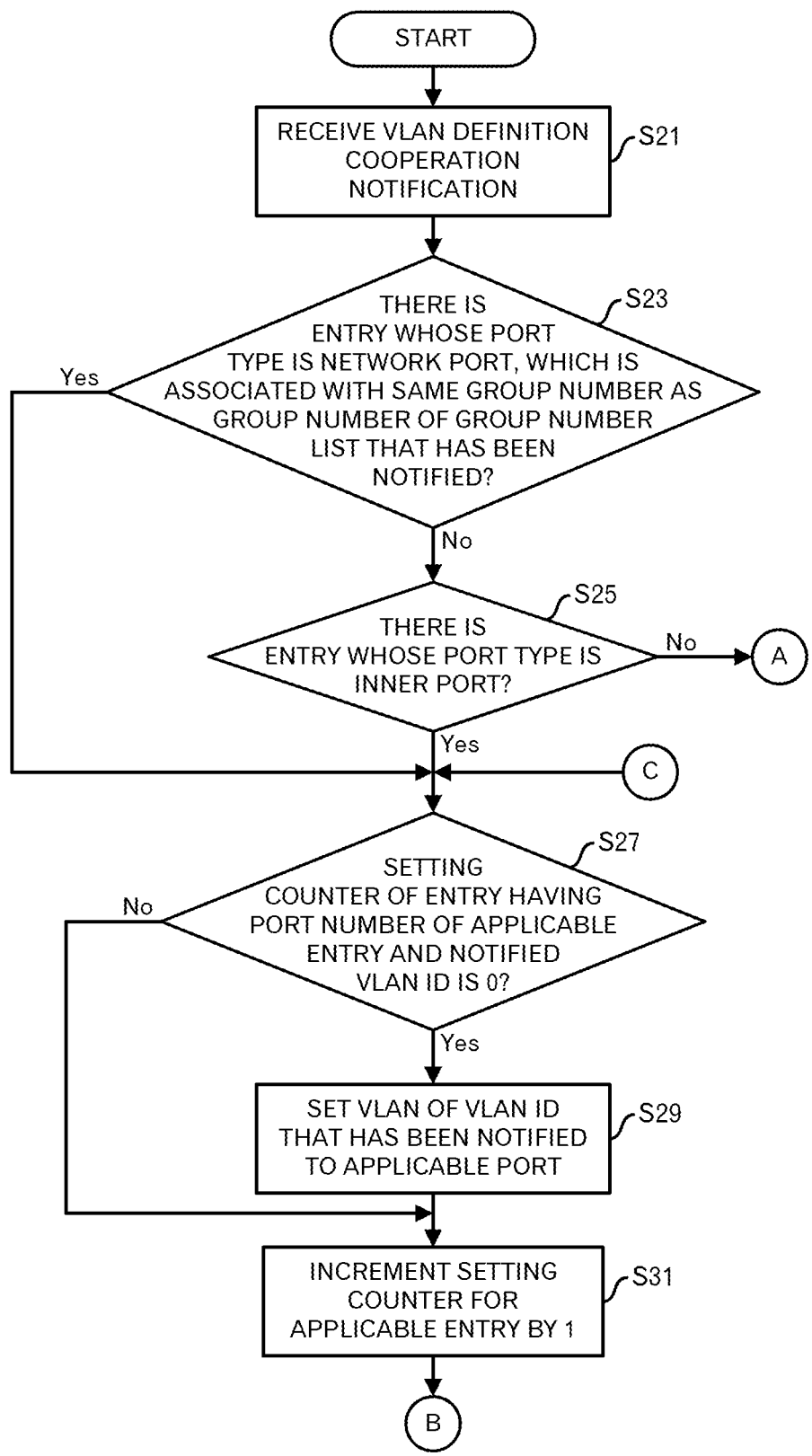
FIG. 7 is a diagram depicting a processing flow performed when receiving a VLAN definition cooperation notification.

Next, by using FIGS. 7 and 8, processing performed by the second setting processing unit 112 that has received the VLAN definition cooperation notification will be explained. A port that has received the VLAN definition cooperation notification from other switches outputs the VLAN definition cooperation notification to the second setting processing unit 112 through the switch hardware 130, for example.

When the second setting processing unit 112 receives the VLAN definition cooperation notification (FIG. 7: step S21), the second setting processing unit 112 determines whether there is an entry whose port type is Network Port, which is associated with the same group number as group number of the group number list that has been notified in the port information table (step S23). In the example of FIG. 4, an entry of a port whose port number is "3" is applicable when group number "1" is included in the group number list.

When it is determined that there is no entry satisfying the condition of the step S23, the second setting processing unit 112 determines whether there is an entry whose port type is Inner Port in the port information table (step S25). In the example of FIG. 4, an entry of a port whose port number is "4" satisfies the condition. If there is no inner port, the processing ends through a terminal A.

On the other hand, when it is determined that there is an entry satisfying the conditions of the step S23 or the step S25, the second setting processing unit 112 identifies a port of an unprocessed entry satisfying the conditions of the step S23 or the step S25, and determines whether a value of a setting counter of an entry, which has a port number of the identified port and the notified VLAN ID, is 0 in the VLAN cooperation table (step S27).

In the example of the network illustrated in FIG. 2, although four end ports of the switches 3 and 4 are included in the group A, there's a possibility that VLAN definitions is to be set for each end port of these end ports. In other words, since the same VLAN ID is sometimes set for each end port of these end ports, counting how many times the VLAN ID is set for each combination of the port and the VLAN ID is performed by using the setting counter, and later it can be determined whether the VLAN should be defined for the ports or not.

The VLAN has not been set for the identified port yet when a value of the setting counter is 0. Therefore, the second setting processing unit 112 applies a VLAN of the notified VLAN ID to the identified port through the switch hardware 130 (step S29). Then, the processing shifts to the step S31.

On the other hand, the VLAN has already been set when a value of the setting counter is not 0. Therefore, the processing shifts to the step S31, and the second setting processing unit 112 increments the value of the setting counter for the identified port by 1 (step S31). Then, the processing shifts to the processing of FIG. 8 through a terminal B.

Shifting to the explanation of the processing of FIG. 8, the second setting processing unit 112 determines whether there is an unprocessed entry whose port type is Network Port, which is associated with the same group number as group number of the group number list that has been notified in the port information table (step S33). For example, entries satisfying the condition of the step S23 are extracted, and it may be determined whether there is an unprocessed entry by processing a list of the entries in order. When it is determined that there is an unprocessed entry satisfying the condition of the step S33, the processing returns to the step S27 through a terminal C.

On the other hand, when it is determined that there is no unprocessed entry satisfying the condition of the step S33, the second setting processing unit 112 determines whether there is an unprocessed entry whose port type is Inner Port in the port information table (step S35). For example, if the processing does not go through the step S25, when the step S35 is executed at first, entries whose port type is Inner Port are extracted, and a list of the entries are processed in order.

When it is determined that there is an unprocessed entry satisfying the condition of the step S35, the processing returns to the step S27 through the terminal C. On the other hand, when it is determined that there is no unprocessed entry satisfying the condition of the step S35, the processing ends.

By executing the processing as described above, a VLAN definition is automatically set for network ports and inner ports. Moreover, by counting how many times the same VLAN definition is set for each combination of a port and a VLAN ID, it can be prevented that the VLAN definition is carelessly removed.

Next, by using FIGS. 9 to 11, processing performed when deletion of a VLAN definition is instructed will be explained.

Figure 9:
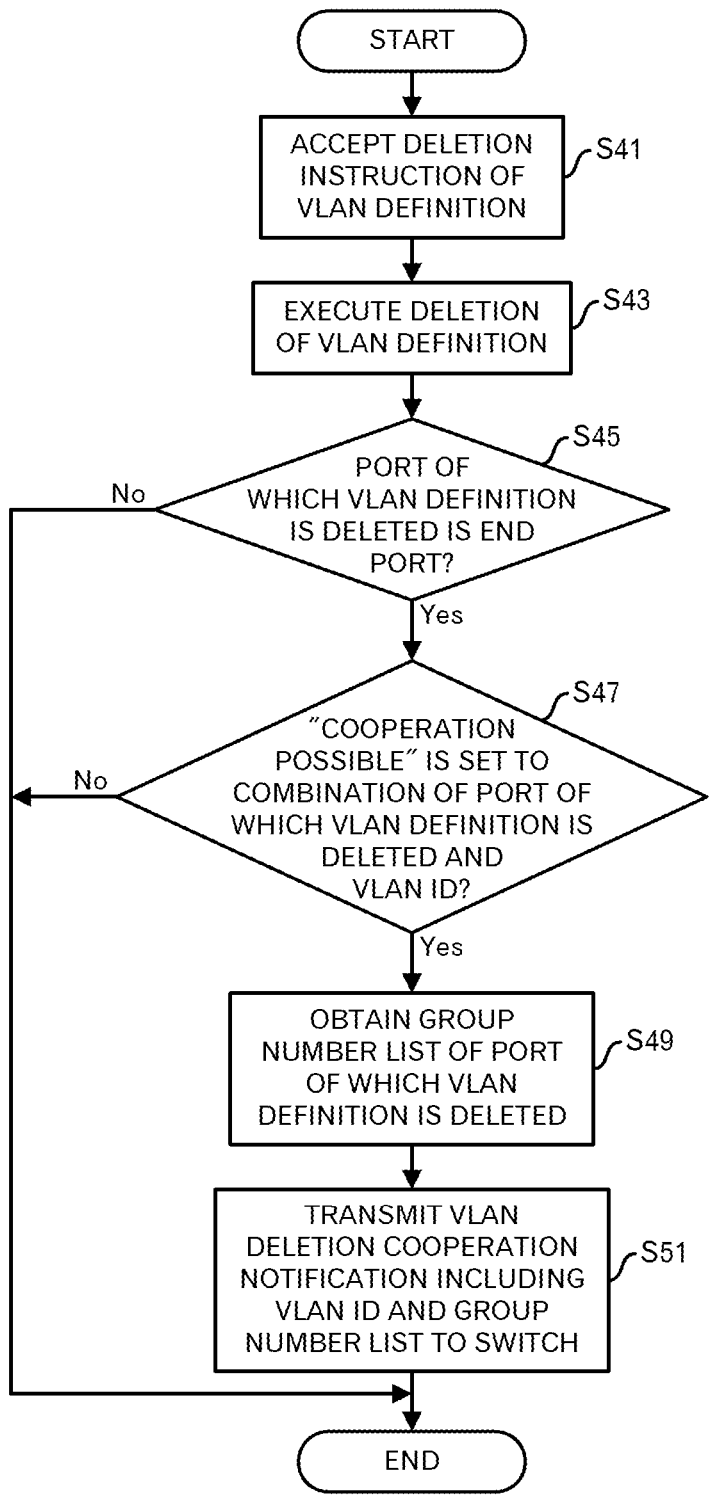
FIG. 9 is a diagram depicting a processing flow performed when deleting the VLAN definition.
Figure 10:
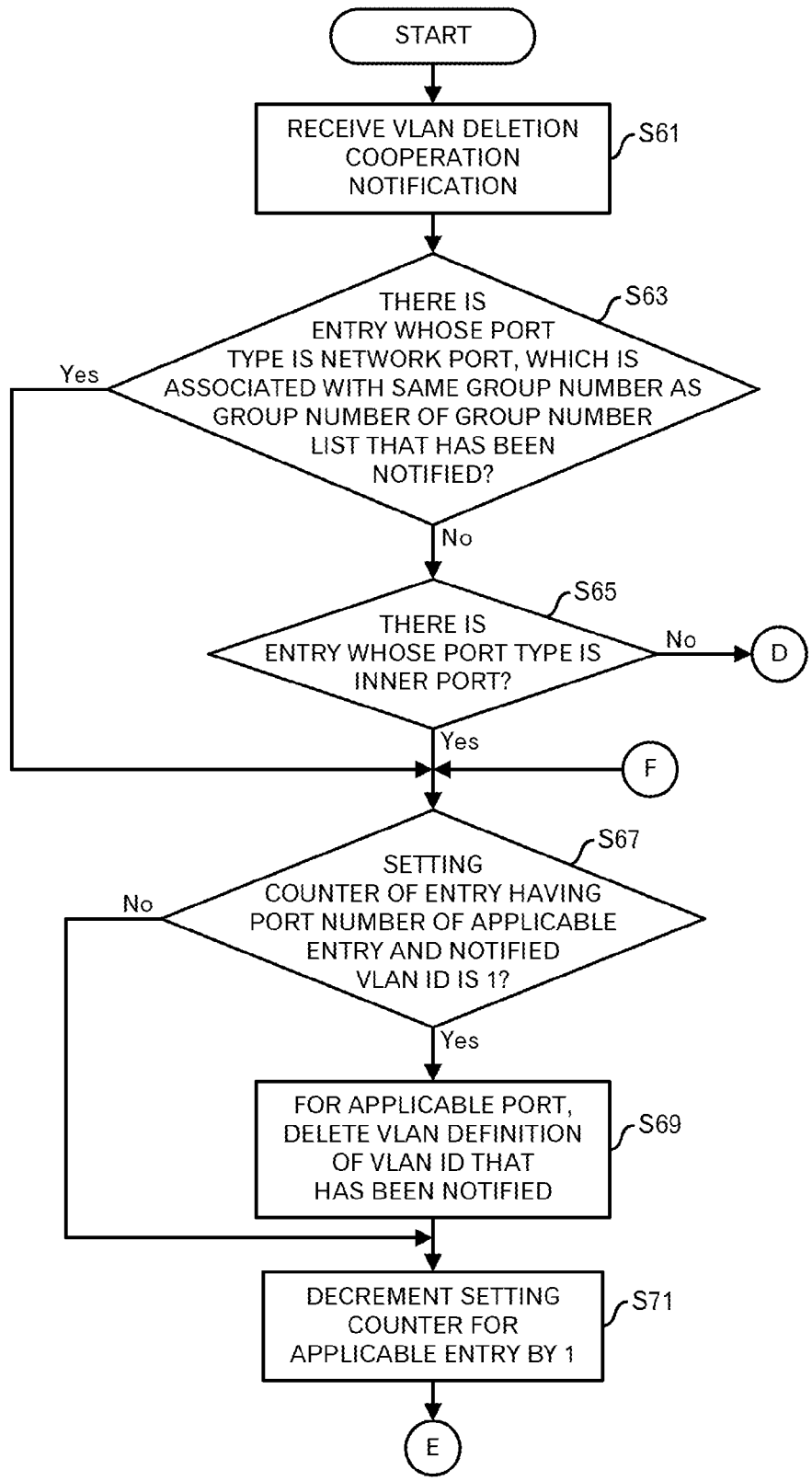
FIG. 10 is a diagram depicting a processing flow performed when receiving a VLAN deletion cooperation notification.

The first setting processing unit 111 accepts a deletion instruction of a VLAN definition for a specific port through a predetermined interface (FIG. 9: step S41). The deletion instruction of the VLAN definition includes a VLAN ID, which relates to the VLAN definition to be deleted.

Then, the first setting processing unit 111 deletes the VLAN definition of the specific port, for example, through the switch hardware 130 (step S43). For example, the VLAN ID is deleted.

Moreover, the first setting processing unit 111 searches the port information table by the port number of the specific port of which the VLAN definition is deleted, and determines whether the specific port is an end port or not (step S45). When it is determined that the specific port is not an end port, the processing ends since the VLAN definition is not reflected to other ports and other switches.

On the other hand, when it is determined that the specific port is an end point, the first setting processing unit 111 determines whether "cooperation possible" is set for a combination of the specific port of which the VLAN definition is deleted and the VLAN ID which has been set in the VLAN cooperation table (step S47). The cooperation possibility flag represents that it is possible to cooperate or not. When it is determined that it is not possible to cooperate, the processing ends.

On the other hand, when it is determined that "cooperation possible" is set for the combination, the first setting processing unit 111 reads out, from the port information table, a group number list of the specific port of which the VLAN definition is deleted (step S49). Furthermore, the first setting processing unit 111 generates VLAN deletion cooperation notification including the VLAN ID and the group number list that has been read out, and transmits it to the second setting processing unit 112 of the switch 100 and other switches (step S51). Then, the processing ends.

Thus, the first setting processing unit 111 deletes the VLAN definition according to the instruction, and notifies other switches that the deletion of VLAN definition to be reflected.

Next, by using FIGS. 10 to 11, processing performed by the second setting processing unit 112 that has received the VLAN deletion cooperation notification will be explained. A port that has received the VLAN deletion cooperation notification from other switches outputs the VLAN deletion cooperation notification to the second setting processing unit 112, for example, through the switch hardware 130.

When the second setting processing unit 112 receives the VLAN deletion cooperation notification (FIG. 10: step S61), the second setting processing unit 112 determines whether there is an entry whose port type is Network Port, which is associated with the same group number as group number of the group number list that has been notified in the port information table (step S63). This condition is the same as that of the step S23.

When it is determined that there is no entry satisfying the condition of the step S63, the second setting processing unit 112 determines whether there is an entry whose port type is Inner Port in the port information table (step S65). This condition is also the same as that of the step S25. If there is no inner port, the processing ends through a terminal D.

On the other hand, when it is determined that there is an entry satisfying the conditions of the step S63 or the step S65, the second setting processing unit 112 identifies an unprocessed port of an entry satisfying the conditions of the step S63 or the step S65, and determines whether a value of a setting counter of an entry, which has the port number of the identified port and the notified VLAN ID, is 1 in the VLAN cooperation table (step S67).

In the example of the network illustrated in FIG. 2, four end ports are included in the switches 3 and 4 in the group A, and there's a possibility that VLAN definitions is to be set for each end port of these end ports. Moreover, there's a possibility that the VLAN definition of each end port of these end ports is to be deleted. Therefore, if a VLAN definition of a network port is deleted when a VLAN ID of an end port is deleted, VLAN definitions of the same VLAN ID, which has been set for other end ports, are deleted in the network port. Then, it becomes impossible for external apparatuses relating to other end ports to properly communicate with apparatuses in the core network side.

Therefore, in this embodiment, it may be checked that there are no other end ports using this VLAN definition at the step S67 since a value of a setting counter, which is 1, represents that there are no other end ports using this VLAN definition.

When a value of a setting counter is 1, there is no problem even if a VLAN definition is deleted. Therefore, the second setting processing unit 112 deletes the VLAN definition of the VLAN ID that has been notified for the identified port (step S69). Then, the processing shifts to the step S71.

On the other hand, when the value of the setting counter is not 1, the VLAN definition has not been deleted yet. Therefore, the processing shifts to the step S71, and the second setting processing unit 112 decrements the value of the setting counter for the identified port by 1 (step S71). Then, the processing shifts to the processing of FIG. 11 through a terminal E.

Figure 11:
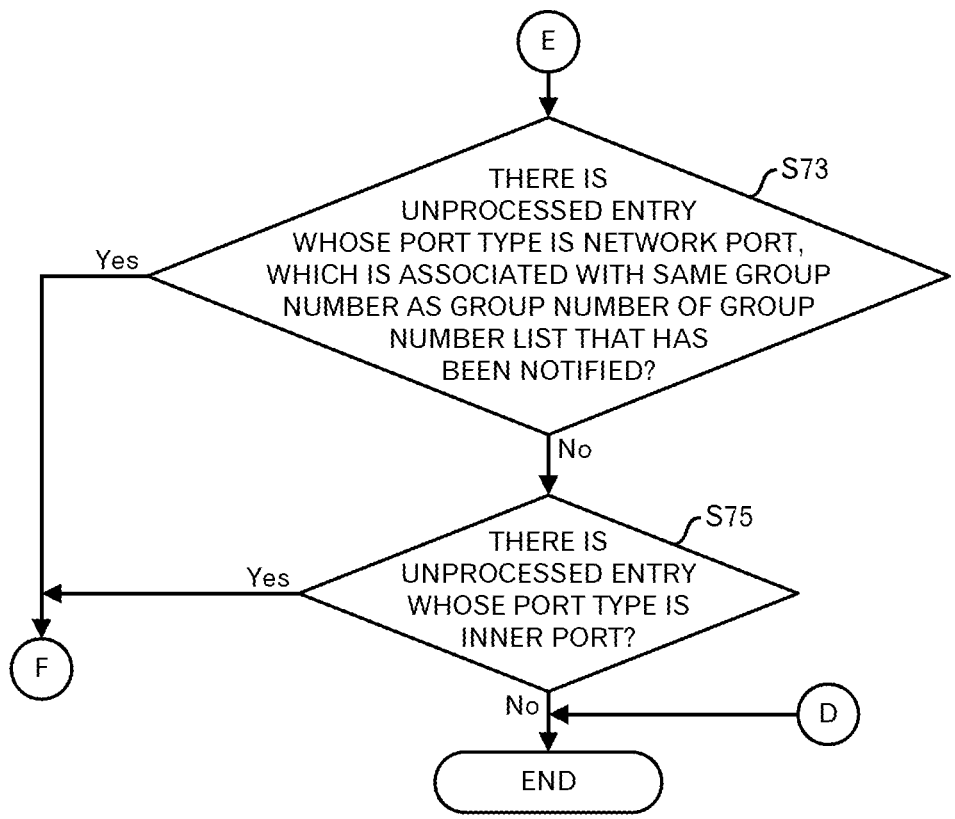
FIG. 11 is a diagram depicting a processing flow performed when receiving the VLAN deletion cooperation notification.

Shifting to the explanation of the processing of FIG. 11, the second setting processing unit 112 determines whether there is an unprocessed entry whose port type is Network Port, which is associated with the same group number as group number of the group number list that has been notified in the port information table (step S73). For example, entries satisfying the condition of the step S63 are extracted, and it may be determined whether there is an unprocessed entry or not by processing a list of the entries in order. When it is determined that there is an unprocessed entry satisfying the condition of the step S63, the processing returns to the step S67 through a terminal F.

On the other hand, when it is determined that there is no unprocessed entry satisfying the condition of the step S63, the second setting processing unit 112 determines whether there is an unprocessed entry whose port type is Inner Port in the port information table (step S75). For example, if the processing does not go through the step S65, when the step S75 is executed at first, entries whose port type is Inner Port are extracted, and a list of the entries are processed in order.

When it is determined that there is an unprocessed entry satisfying the condition of the step S75, the processing returns to the step S67 through the terminal F. On the other hand, when it is determined that there is no unprocessed entry satisfying the condition of the step S75, the processing ends.

Ina server peripheral network (and a network of a general server system) established in a data center, it is difficult for server managers who carry out setting for servers to carry out both setting for servers and setting for networks, and a demand for automating network configuration has increased. For this situation, there's attention to the matter that a network switch is allocated between external apparatuses such as servers or storages and a core network in network environment deployed on the preceding stage of servers in the data center. And it is possible to simplify network settings by automatically reflecting VLAN definitions of ports of external apparatuses side to ports connected to the core network side.

Moreover, unnecessary settings of VLAN definitions are never applied to the ports of the core network side by reflecting only VLAN settings of the external apparatuses side. Therefore, it is possible to prevent unnecessary traffic from flowing from the core network and to realize improvement of security. Moreover, even if plural external apparatuses belong to the same VLAN, it becomes possible to avoid the situation such that unnecessary deletion is performed and the communication stops when VLAN definitions are deleted, by preparing a setting counter of a VLAN definition for a port of the core network side.

Although the embodiment of this technique was explained above, this technique is not limited to those. For example, as for the processing flow, as long as the processing results do not change, the turns of the steps maybe exchanged or the steps may be executed in parallel. Moreover, the functional block diagram of FIG. 3 is an example, and the configuration in the functional block diagram does not always correspond to actual program module configuration and hardware configuration.

Figure 12:
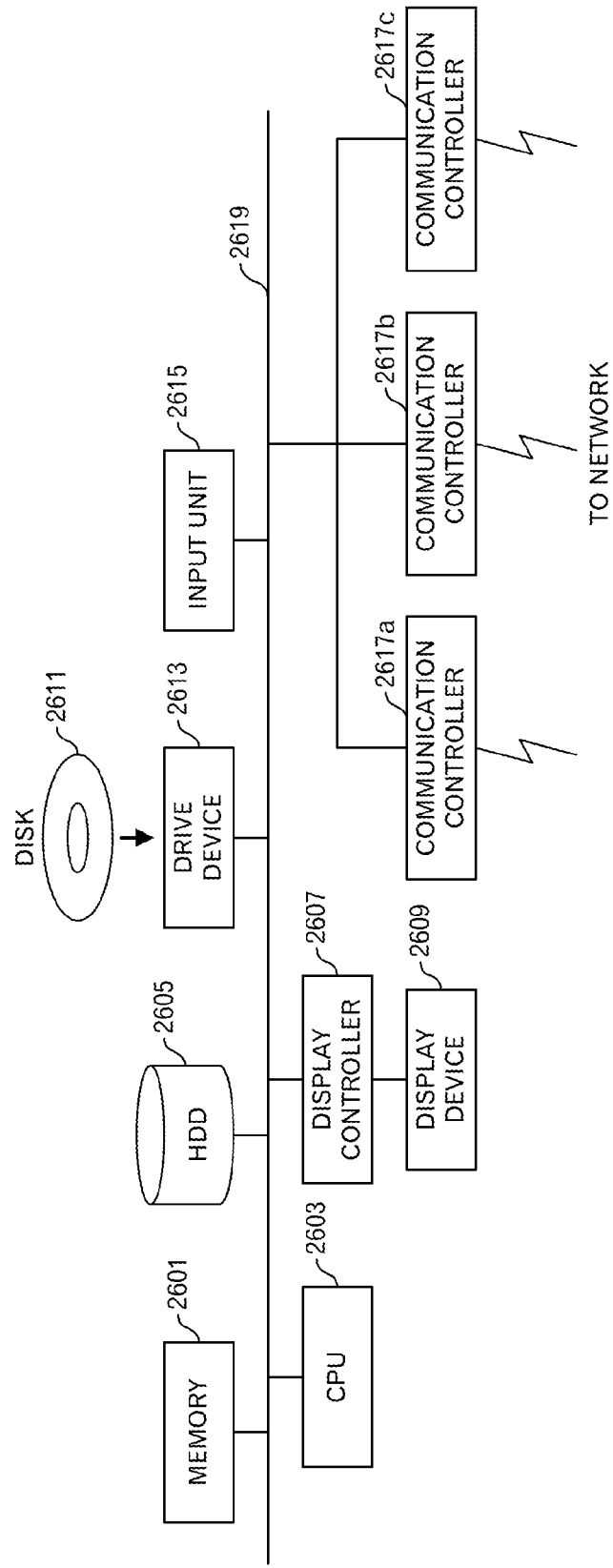
FIG. 12 is a functional block diagram representing a case such that a switch is implemented by a computer.

Moreover, the aforementioned switch 100 sometimes has configuration such that a memory 2601, a CPU 2603, a hard disk drive (HDD) 2605, a display controller 2607 connected to a display device 2609, a drive device 2613 for a removable disk 2611, an input unit 2615, and communication controllers 2617 (In FIGS. 12, 2617a to 2617c) for connection with a network are connected through a bus 2619 as shown in FIG. 12. In some case, the display controller 2607, the display device 2609, the drive device 2613 and the input unit 2615 are not included. An operating system (OS: Operating System) and an application program for carrying out the foregoing processing in the embodiment, are stored in the HDD 2605, and when executed by the CPU 2603, they are read out from the HDD 2605 to the memory 2601. The CPU 2603 controls the display controller 2607, the communication controllers 2617, and the drive device 2613 as necessary, and causes them to perform necessary operations. Data that is input through any one of the communication controllers 2617 is output through another communication controller 2617. The CPU 2603 controls the communication controllers 2617, and properly switches the output destination. Besides, intermediate processing data is stored in the memory 2601, and if necessary, it is stored in the HDD 2605. In this embodiment of this technique, the application program to realize the aforementioned functions is stored in the computer-readable, non-transitory removable disk 2611 and distributed, and then it is installed into the HDD 2605 from the drive device 2613. It may be installed into the HDD 2605 via the network such as the Internet and the communication controller 2617. In the computer as stated above, the hardware such as the CPU 2603 and the memory 2601, the OS and the necessary application programs systematically cooperate with each other, so that various functions as described above in details are realized.

The aforementioned embodiment is summarized as follows:

A switch relating to this technique includes: a first applying unit that applies a setting of a virtual subnetwork to a first port that is connected to an external apparatus, upon detecting an instruction to apply the setting to the first port; and a second applying unit that applies, upon detecting that the setting was applied to the first port in the switch or other switches, the setting to a second port that is connected to an external network and is associated with the first port in advance.

By this means, the setting of the virtual subnetwork for the first port connected to the external apparatus is automatically reflected to the second port connected to the external network.

Moreover, the second applying unit may count, in association with an identifier of a port and an identifier of a virtual subnetwork, a number of times that a setting of the virtual subnetwork was applied to the first port that is associated with the port and is in the switch or the other switches; and apply, upon detecting that a number of times for the second port is zero, the setting to the second port. By this means, the setting is properly removed (deleted) by counting how many times the setting has been applied, because the same setting of the virtual subnetwork can be applied to plural first port which are associated.

Furthermore, the first applying unit may transmit a notification including an identifier of a group of ports associated with the first port and an identifier of the virtual subnetwork to the second applying unit and the other switches. In this case, the second applying unit may apply the setting to the second port upon detecting the notification. By this means, the association can be flexibly performed.

Furthermore, the second applying unit may apply the setting to ports other than the first port and the second port. This is because the setting of the virtual subnetwork is used for relaying frames among switches.

Moreover, first applying unit may include a first removing unit that removes the setting of the virtual subnetwork applied to the first port, upon detecting an instruction to remove the setting applied to the first port. In this case, the second applying unit may include a second removing unit that removes, upon detecting that the setting applied to the first port that is associated with the second port was removed, the setting applied to the second port. Thus, removal of the setting of the virtual subnetwork applied to the first port connected to the external apparatus is automatically reflected to the second port connected to the external network.

Furthermore, the second removing unit may count, in association with an identifier of a port and an identifier of a virtual subnetwork, a number of times that a setting of the virtual subnetwork was applied to the first port that is associated with the port and is in the switch or the other switches; and remove, upon detecting that a number of times for the second port is zero, the setting applied to the second port. When it is confirmed that the setting of other first ports are not left, it becomes possible to remove the setting of the second port associated with the first ports.

Furthermore, the first removing unit may transmit a notification including an identifier of a group of ports associated with the first port and an identifier of a virtual subnetwork to the switch and the other switches. And the second removing unit may execute processing related to removal of the setting in response to the notification. By this means, the setting is properly removed.

Furthermore, the second removing unit may remove the setting for ports other than the first port and the second port.

Moreover, the first applying unit may apply the setting to the first port, upon detecting that cooperation of settings of virtual subnetworks is set for a combination of an identifier of the virtual subnetwork and the first port. It becomes possible to flexibly reflect the setting.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch, comprising: a memory; and a processor configured to use the memory and execute a process, the process comprising:
    first applying a setting of a virtual subnetwork to a first port that is in the switch and is connected to an external apparatus, upon detecting an instruction to apply the setting to the first port; and
    upon detecting that the setting was applied to the first port in the switch or receiving, from another switch, a first notification representing that the setting was applied to a second port that is in another switch and is connected to the external apparatus or another external apparatus, second applying the setting to a third port that is connected to an external network and is associated with the first port or the second port in advance.

2. The switch as set forth in claim 1, wherein the second applying comprises:
    counting, in association with an identifier of a port and an identifier of a virtual subnetwork, a number of times that a setting of the virtual subnetwork was applied to the first port that is associated with the port or a number of times that the setting of the virtual subnetwork was applied to the second port that is associated with the port; and
    upon detecting that a number of times for the port is zero, applying the setting to the third port.

3. The switch as set forth in claim 1, wherein the first applying comprises
    transmitting a second notification including an identifier of a group of ports associated with the first port and an identifier of the virtual subnetwork to the switch and the another switch, and
    the third applying comprises:
        applying the setting to the third port upon detecting the notification.

4. The switch as set forth in claim 1, wherein the second applying comprises
    applying the setting to ports other than the first port and the third port.

5. The switch as set forth in claim 1, wherein the first applying comprises
    first removing the setting of the virtual subnetwork applied to the first port, upon detecting an instruction to remove the setting applied to the first port, and
    the second applying comprises
    upon detecting that the setting applied to the first port that is associated with the third port was removed, or receiving from the another switch, a third notification representing that the setting applied to the second port that is associated with the third port was removed, second removing the setting applied to the third port.

6. The switch as set forth in claim 5, wherein the second removing comprises:
    counting, in association with an identifier of a port and an identifier of a virtual subnetwork, a number of times that a setting of the virtual subnetwork was applied to the first port that is associated with the port; or a number of times that the setting of the virtual subnetwork was applied to the second port that is associated with the port and upon detecting that a number of times for the third port is one, removing the setting applied to the third port.

7. The switch as set forth in claim 5, wherein the first removing comprises transmitting a fourth notification including an identifier of a group of ports associated with the first port and an identifier of a virtual subnetwork to the switch and the another switch, and the second removing comprises executing processing related to removal of the setting in response to the fourth notification.

8. The switch as set forth in claim 5, wherein the removing comprises removing the setting for ports other than the first port and the third port.

9. The switch as set forth in claim 1, wherein the first applying comprises:

applying the setting to the first port, upon detecting that a flag representing that settings of virtual subnetworks are reflected to other switches is set for a combination of an identifier of the virtual subnetwork and the first port.

10. A non-transitory computer-readable storage medium storing a program for causing a computer to execute a process, the process comprising:

first applying a setting of a virtual subnetwork to a first port that is in the switch and is connected to an external apparatus, upon detecting an instruction to apply the setting to the first port; and upon detecting that the setting was applied to the first port in the switch or receiving, from another switch, a first notification representing that the setting was applied to a second port that is in another switch and is connected to the external apparatus or another external apparatus, second applying the setting to a third port that is connected to an external network and is associated with the first port or the second port in advance.

* * * * *